Patented Dec. 7, 1937

2,101,635

UNITED STATES PATENT OFFICE.

2,101,635

RESIN DEHYDRATION

Howard L. Bender, Bloomfield, N. J., assignor to Bakelite Corporation, New York, N. Y., a corporation of Delaware No Drawing. Application April 16, 1931, Serial No. 530,721

7 Claims. (Cl. 106—22)

This invention relates to the dehydration of synthetic resins and more particularly to resinoids, that is, resins which in their initial state are heat-reactive or hardenable to an infusible state by the application of heat.

As is well known, the ingredients for producing a synthetic resin are reacted in a digestor. Water is present with the ingredients and in the condensation that takes place further amounts of water are released which is customarily removed before the product is ready for commercial sale or use. In the case of resinoids particularly, the time and temperature cycle involved in this dehydration step causes a progressive advancement or hardening; but this factor of resinoid change is undesirable as it lessens the permissible period for mixing of the dehydrated resinoid with filler and/or other ingredients and renders the mixing operation more critical and difficult in accordance with the stage of resinoid advancement.

For most resinoid applications or uses it is essential that the dehydration be made as complete as possible. But it is the removal of the last 5 and 10 per cent of water that interposes the greatest difficulties due to the decided tendency of a reactive resin, i. e. resinoid, to stick to hot metal walls and to go "rubbery" or "kick over" into a useless infusible product at this stage unless extreme care is exercised.

The present invention has for its basis the discovery that a liquid mixture of either resin or resinoid and water can be sprayed or projected into a current or stream of hot air or gas to secure substantially instantaneous and complete removal of the moisture content while in a finely divided condition. By so doing another most important advantage can be obtained, namely, dehydration with controlled advancement or hardening of a resinoid, for the heat-hardening of a resinoid depends upon the length of time in contact with a heating medium as well as the temperature used and size of particles to be dried.

This method of dehydration by projecting small resin particles into a heated gas stream, gives an economical method in handling permanently fusible resin both for dehydration of the resins and at the same time for producing the dried resin in a fine powder form suitable for dissolving in solvent or for mixing with wood flour or other fillers. It moreover permits of the elimination of a pulverizing operation formally considered necessary thereby resulting in a marked economy of plant procedure.

As applied to resinoids, or heat reactive or hardenable resins, it permits in addition to the above economy, drying with controlled material change or advancement of a resinoid. Since a resinoid has a definite fusibility time limit at a temperature above its plastic flow point, any interval of time occurring in the dehydration step during which the temperature is above such a point (or a minimum critical temperature at which the hardening effect begins, within a range of 40–100° C.), reduces proportionally the time available for handling the resinoid in succeeding steps of hot rolling, etc. A method of dehydration which actually reduces the time of exposure to less than a minute accordingly makes possible a more accurate control of the present commercial resinoids and also makes possible the commercial use of those rapidly changing resinoids which in the past have not found commercial use since they were transformed to the infusible stage in ordinary processes for dehydration. Furthermore a large class of fairly rapidly changing resinoids which in the past could only be produced by vacuum dehydration and low temperatures can by this method be obtained with atmospheric dehydration or, with higher temperatures for short time exposures. In this connection it is to be noted that since these resinous materials are in the class of poor heat conductors a uniform change in or throughout a mass can only be obtained either by heating the material in small masses or by obtaining a rapid heat flow within the bulk of the mass through the medium of convection currents. But rapid flow within the resin masses is difficult to attain due to the relatively high viscosities of these resinous products, and high rates of flow at a heating surface like a copper wall are even more difficult due to the adhering nature of the melted resinous mass. Therefore it follows that by exposing small particles to a hot air current more uniform and homogeneous resinoid changes are obtained than hitherto thought possible.

As a specific example, for illustration, a resinoid is produced by digesting a mixture of 100 parts by weight of phenol, 69 parts of formaldehyde (37% aqueous solution) and 1 part of oxalic acid as catalyst for about 6 hours. During this period the resinoid forms and separates out to give a milky-appearing liquid mass. The mixture can at this stage or after a partial removal of water in an open kettle be submitted to dehydration in accordance with this invention by spraying it through a nozzle into a chamber. A nozzle suitable for this purpose is a suction type using superheated steam under pressure to give the required force for disrupting the resin-water stream into fine particles. Within the spray chamber a current of heated air is maintained at a temperature and rate of flow sufficient to evaporate the water from the spray but not to carry off the particles. The fine particles of resin are rapidly dehydrated and fall to the bottom for collection.

Apparatus for this method of drying can be constructed in various ways. A convenient form is an elongated spray chamber with a hopper bottom having a screw or other conveyor in the bottom. The spraying nozzle is located near the top of one end and the hot air inlet is located in the closed top of the chamber. Enough pressure is applied to the entering stream of water and resin to spread the spray over the length of the chamber but preferably not against the sides thereof; for this purpose the pressure is dependent upon the type of nozzle used, as well as the dimensions of the chamber. A pressure of about 15 pounds at the nozzle has been found sufficient with a non-clogging oil burner type of sprayer to carry a spray of the character above described through a distance of about 20 feet. The temperature of the incoming air is regulated to accord with the relative proportions of air and water present, but a temperature of about 250–300° C. has been found suitable for removing the water content with the desired rapidity when a sufficient quantity of air is used to avoid interference with the falling of the resin particles. Of course with smaller percentages of water in the mixture the proportion removed at a given rate of dehydration is increased; thus from a mixture of 80 per cent resinoid and 20 per cent water the dehydrated resinoid production is roughly six times as fast as from a mixture of 40 per cent resinoid and 60% water. It is therefore advantageous from this point of view to partially dehydrate the mixture before spraying.

An alternative form of apparatus comprises a cylindrical spray tower having in the top a centrifugal type of sprayer using a whirling disk running at about 10,000 R. P. M. The resin is thus mechanically sprayed into a heated air stream which passes through the tower to remove the moisture.

The hot air current is preferably applied in this type of apparatus at the top so as to move concurrently with the resinous particles down the tower. Near the lower part of the tower the then partly cooled air current is conducted aside through proper side openings, of sufficient volume to have the air moving at a low rate so that but small amounts of dust are entrained. Any entrained dust may if desired be removed from the air stream, and recovered by standard air-dust separators as cyclone or bag type separators. Entrained moisture or volatiled products, for example, cresol, certain types of diphenols or resins, etc. may be separated from the air stream by standard methods for condensing or scrubbing volatile matter from an air stream; for instance separation can be obtained by passing the air stream through a cooling spray or passing it through a wash solution of low volatile liquid or over an absorbent contact mass as silica jell.

With this type of apparatus it is found desirable in some cases to admit a counter current of cold air near the bottom which joins the down coming stream of heated air at the side outlets. With large areas and low rate of outlet air flow, the dried resin particles leave the warm air stream and fall by gravity through the gentle counter current of cold air. The cooled, hard resin particles falling to the floor of the apparatus are removed therefrom by any convenient method as by a mechanical rake. In place of a cold air current the dried droplets or particles can be directed or impinged upon a cooled surface of metal or other suitable material. The particles do not adhere to metal when cold and they are therefore readily removed. With the surface in an inclined position the particles will roll or slide off, depending upon the condition of hardness when striking the surface and the consequent retention of the spheroidal form or flattening into discs. Such an apparatus with an upper heated section for dehydrating and a lower section for cooling is practically adapted generally for producing dry powders. For resins in other forms it may be more convenient to catch the fine dried liquid droplets while still warm enough to coalesce and conduct the coalesced mass to a convenient outlet, where it may be cooled or further heated as desired.

By the combined steps of spraying and then subjecting to a current of hot gas, resins in the form of liquids or powdered solids, in any state of advancement or heat-hardening are obtainable with practically instantaneous rapidity by regulating the resin dispersion and the temperature and flow of hot gas. The powdered solid form has better keeping qualities than the customary ground resin and is ideal for blending various batches of resin or blending different resins for desired effects.

The method of dehydration here disclosed is also well adapted to the preparation of resinoids of the two-step type. It is customary to prepare a slowly or non-reactive resin initially in order to be able to dehydrate it properly and then to include hexamethylenetetramine as a hardening agent. By the present process as an alternative method the hexa can also be added to the wet resin, thus securing better mixing and thereupon dehydrating without material change in the composition.

Not only can a hardening agent be included in the wet mixture but other additions are possible, such as fibrous fillers, and in any proportion so long as the mixture is fluid, i. e. has appreciable flow. For instance a highly desirable and economical method of mixing wood fibers and resins or resinoids is by the so-called wet process, that is, forming a pulp of wood fiber and water and mixing the resin therein. The dehydration of this mixture after its formation, however, is a serious problem and the methods heretofore developed have involved the formation of a sheet and then removing the water from the sheet. By applying spray drying as here described the water is readily eliminated from and without injury to either the fibers or the resin. The result is a mixture of loose fibers generally coated with resin and/or mixed with resin particles retaining the maximum strength of the fibers and suitable for molding. A further advantage associated with mixtures of fiber and resins dried in this manner is that products molded from them show superior water resistance and this appears due to the improved coating of the fibers with the resin.

The process is applicable to all types of resins or resinoids such as phenol-formaldehyde, glycerol-phthalic anhydride, urea-formaldehyde, cumarone, ketone, and other types of synthetic resins as well as natural resins either alone or in admixture with other synthetic resins. Various colors, dyes, plasticizers, or other solvents or modifying agents can be included with them prior to or after the drying process.

As a dehydrating medium either oxidizing gases such as air, etc. or non-oxidizing gases like $CO_2$, steam or helium can be used when the resin is sensitive to oxidation. Likewise volatilized liquids other than steam as diphenyl oxide can be adapted for this purpose. On account of the extreme rapidity of action possible the process time required for making resins is correspondingly reduced and the release of the resin-making stills from the step of dehydration practically doubles the capacity of the stills.

Various forms of products are obtainable by this method of dehydration depending upon the nature of the composition and other factors. For instance, with dehydration of a resinoid-water mixture as given in the example by the use of hot air currents and cooling to a solid condition while in suspension, spherical bodies are formed which may vary from .001 to .004 inch in diameter. These are either small balls or hollow spheres depending upon operating conditions such as the rate of spraying and viscosity of mixture sprayed. If the resin particles are allowed to strike a hard surface while in a soft condition, the bodies tend to flatten into the form of discs. When other ingredients are included such as wood fiber, the resin particles produced by the spraying action tend to form about the fibers as nuclei and give spherical bodies or coated fibers depending on the relative sizes of the fibers and the resin particles.

The resinous bodies produced by this method are found to present distinct advantages over ground or powdered resins in that they are comparatively free from the tendency to sinter or flow together. Accordingly they can be stored, blended or otherwise handled much more readily than the ground forms of resin. They likewise show a much lower water absorption which simplifies storage problems.

The term "spraying" as used herein applies to any method or means for projecting, propelling or dispersing the fluid or wet mixtures containing resin into fine droplets or particles and is not to be construed as limited to the specific disclosures made for the purposes of describing the invention.

I claim:

1. Process for removing volatile liquid from a fluid mixture including with the volatile liquid a synthetic resin hardening to a solid infusible state upon heating which comprises projecting the mixture in the form of finely divided particles into a current of relatively dry gas heated to a temperature causing volatilization of the liquid and sufficiently high to cause fusing and heat-hardening of the resin, and limiting the time of contact of the heated gas with the mixture so as to secure substantial removal of the liquid but without transforming the resin to its heat-hardened state.

2. Process of preparing a resin of the heat-hardening type which comprises reacting the ingredients forming the resin in the presence of water, projecting the liquid and resin mixture in the form of finely divided particles into a current of relatively dry gas heated to a temperature causing volatilization of the liquid content and sufficiently high to cause fusing and heat-hardening of the resin, and limiting the time of contact of the heated gas with the mixture so as to secure substantial removal of the liquid but without transforming the resin to its heat-hardened state.

3. Process of preparing a resin of the heat-hardening type which comprises reacting the ingredients forming the resin in the presence of water, partially removing water from the reaction mixture, projecting the mixture in the form of finely divided particles into a current of relatively dry gas heated to a temperature causing volatilization of the liquid and sufficiently high to cause fusing and heat-hardening of the resin, and limiting the time of contact of the heated gas with the mixture so as to secure substantial removal of the liquid but without transforming the resin to its heat-hardened state.

4. Process of preparing compositions moldable under the action of heat and pressure which comprises forming a wet mixture of a fibrous filler and a synthetic resin hardening to a solid infusible state upon heating, projecting the mixture in the form of finely divided particles into a current of relatively dry gas heated to a temperature causing volatilization of the liquid and sufficiently high to cause fusing and heat-hardening of the resin, and limiting the time of contact of the heated gas with the mixture so as to secure substantial removal of the liquid but without transforming the resin to its heat-hardened state.

5. Process for removing volatile liquid from a fluid mixture including with the volatile liquid a synthetic resin hardening to a solid infusible state upon heating which comprises projecting the mixture in the form of finely divided particles into a current of relatively dry gas heated to a temperature causing volatilization of the liquid and sufficiently high to cause fusing and heat-hardening of the resin, and directing the particles after contact with the heated gas into a relatively cool zone to arrest any heat-hardening action of the resin and promote solidification by cooling, limiting the time of contact of the heated gas with the mixture so as to secure substantial removal of the liquid but without transforming the resin to its heat-hardened state.

6. Process for removing volatile liquid from a fluid mixture including with the volatile liquid a synthetic resin hardening to a solid infusible state upon heating which comprises projecting the mixture in the form of finely divided particles into a current of relatively dry gas heated to a temperature causing volatilization of the liquid and sufficiently high to cause fusing and heat-hardening of the resin, and directing the particles after contact with the heated gas into a current of relatively cool gas to arrest any heat-hardening action of the resin and promote solidification by cooling, limiting the time of contact of the heated gas with the mixture so as to secure substantial removal of the liquid but without transforming the resin to its heat-hardened state.

7. Process for removing volatile liquid from a fluid mixture including with the volatile liquid a synthetic resin hardening to a solid infusible state upon heating which comprises projecting the mixture in the form of finely divided particles into a current of relatively dry gas heated to a temperature causing volatilization of the liquid and sufficiently high to cause fusing and heat-hardening of the resin, and directing the particles after contact with the heated gas upon a cooled surface to arrest any heat-hardening action of the resin and promote solidification by cooling, limiting the time of contact of the heated gas with the mixture so as to secure substantial removal of the liquid but without transforming the resin to its heat-hardened state.

HOWARD L. BENDER.